UNITED STATES PATENT OFFICE.

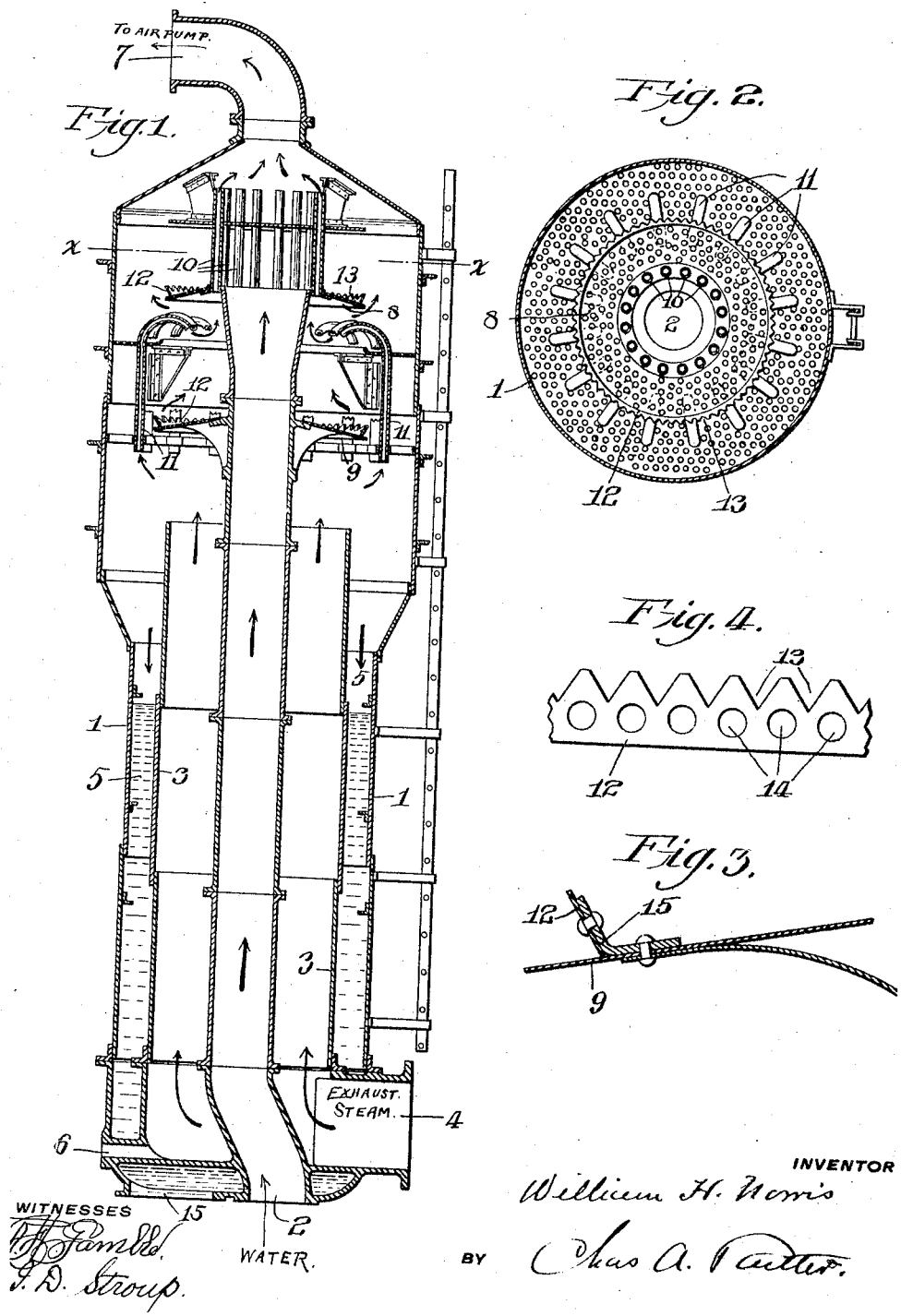

WILLIAM H. NORRIS, OF PHILADELPHIA, PENNSYLVANIA.

BAROMETRIC STEAM-CONDENSER.

1,043,135.  Specification of Letters Patent.  Patented Nov. 5, 1912.

Application filed October 3, 1911. Serial No. 652,485.

*To all whom it may concern:*

Be it known that I, WILLIAM H. NORRIS, a citizen of the United States, and a resident of the city and county of Philadelphia, State of Pennsylvania, have invented certain new and useful Improvements in Barometric Steam-Condensers, of which the following is a specification.

My invention relates to improvements in barometric condensers and primarily to means for increasing the efficiency of the condenser by preventing therein the trapping or accumulation of air or gases which reduce the vacuum to a lower degree than is desirable.

My invention further relates to certain improvements in the construction of the condenser which will be pointed out in detail hereinafter.

In the accompanying drawings forming part of this specification and in which similar numerals of reference indicate similar parts throughout the several views: Figure 1, is a central vertical sectional elevation of a counter-current barometric condenser embodying my improvements; Fig. 2, a plan of the condenser, the top covering being removed; Fig. 3, a sectional elevation, upon an enlarged scale, of part of the lower water distributing hood; Fig. 4, a front elevation of the perforated and serrated rim carried peripherally by the distributing hoods.

Experiment has shown that the efficiency of a counter-current barometric condenser is very appreciably lessened by air or gases which become trapped in it during its operation, either under hoods or other projections or by the injection water and that the vacuum, ordinarily not exceeding twenty-seven and one half inches in summer temperatures and twenty-eight inches in winter temperature, can be raised to from twenty-eight and one half to twenty-nine inches by providing means for preventing the trapping or holding of the air or gases in the instrument. This trapping usually takes place beneath the hood or hoods employed to distribute the injection water to the instrument after it overflows from the injection pipe, if such hoods be used, or the falling water itself carries down and holds air which cannot escape and the first object of my invention is to furnish means for tapping the traps and conducting any air or gas that may accumulate therein, or which may be carried and held by the water, to the pipe which communicates with the dry air pump.

1 is the casing of a condenser, 2 the pipe, in this case placed centrally in reference to casing 1, through which the cold injection water is introduced. 3 is a casing within casing 1 and surrounding pipe 2 through which the steam from the pipe 4, which is connected with the exhaust of the engine passes. The chamber 5 formed between the casings 1 and 3 receives the water of condensation and the injection water and is connected with the hot well through an opening 15, Fig. 1. 6 is a bleed duct through which any water accumulating in the bottom of the chamber formed by the casing 3 may be drawn off. 7 is the pipe leading from the top of the instrument to the dry air pump. All of these parts of the machine are so well known that detailed description of them will be unnecessary.

At the top of the injection pipe is a hood 8 over the top of which the water overflowing from pipe 2 flows and from which it falls in a spray to the chamber 5 formed between casings 1 and 3. Beneath hood 8 is a hood or hoods 9 for the purpose of intercepting any water that might fall so close to the pipe 2 as to enter the steam chamber formed between this pipe and the casing 3.

Experiment has shown that there is always a certain amount of air trapped beneath the hoods 8 and 9 and between the water falling from the periphery of these hoods and the pipe 2, and even in the falling water itself, the suction of the dry air pump being unable, even under the most favorable circumstances, to prevent this, hence the vacuum in the instrument is reduced. To prevent this trapping I tap the air pockets by means of pipes or tubes which, either alone or in conjunction with one another, lead the air or gas to a point within the casing 1 which is above the level of any water discharged through the injection pipe 2 from which point it is drawn off through the dry air pipe 7 in the usual manner. As I have before stated I find that by this arrangement the vacuum within the casing 1 is very considerably increased.

A suitable and convenient means for tapping the trap formed under the upper hood 8 consists of tubes 10 which surround the upper end of the injection pipe 2 and which pass through the hood their lower ends communicating with the space beneath it. These tubes are of sufficient length that their tops will be above the water discharged from the injection pipe.

To tap the pocket formed under the second hood 9 or to collect the air carried downward by the falling water, I have found it sufficient to employ the tubes 11 the lower ends of which are outside the hood 9 and some distance below it and the upper ends of which are bent to shed water falling upon them from hood 8 and to discharge under the said hood. I do not, however, desire to confine myself to any particular arrangement or means for tapping pockets of air or gas in the condenser as my invention contemplates any suitable means for this purpose.

In a condenser of this character the even distribution of the water is very important in order that all of the steam may be condensed. A certain amount of condensation will take place within the casing 3 owing to the steam coming in contact with the cold injection pipe 2 but this will be comparatively trifling. The main condensation takes place when the steam issuing from top of casing 3 comes in contact with the veil or spray of water falling from the peripheries of the hoods 8—9, which hoods are of diameter sufficient to cause the water to fall from them into the space 5 included between the casings 1 and 3.

The hoods 8—9 carry upon their upper sides, at a point perferably inside of their peripheries, an annular rim 12 the upper edge of which is furnished with serrations 13 and which is furnished with perforations 14, both of which are best shown in Fig. 4. The rim is preferably held in place by angles 15, Fig. 3 and the hoods are secured to the injection pipe in any suitable and convenient manner.

The water overflowing from the top of the injection pipe 2 runs over the top of hood 8 banks up against the rim 12 and flows out through the perforations 14 and serrations 13 therein and falls from the hood in an even spray or veil. Any water that collects upon the hood 9, or upon other hoods if they be used, is likewise caused to fall therefrom in an even manner.

Having thus described my invention I claim as new and desire to secure by Letters Patent:—

1. In a steam condenser of the character set forth, in combination, an outer casing, a connection leading from the upper end of said casing to a dry air pump, a casing, open at its upper end, within said outer casing forming a passage for exhaust steam, a pipe passing up within said inner casing, open at its upper end, for the introduction of injection water, an annular rim surrounding the upper end of said injection pipe, and tubes carried by and passing through said rim and surrounding the injection water pipe, the upper ends of said tubes being above the level of the water discharged from said injection water pipe, all substantially as and for the purposes set forth.

2. In a condenser of the character set forth, in combination, an outer casing, a connection from the upper end of said casing to a dry air pump, a casing, open at its upper end, within said outer casing, a steam pipe connected with the lower end of said inner casing, a connection between the space inclosed by said casings and the hot well, an injection water pipe passing up through said inner casing to a point near the upper end of said outer casing, a water distributing hood carried by and surrounding the upper end of said injection water pipe, tubes passing through said hood their upper ends being above the level of the water discharged from said injection water pipe, a water distributing hood beneath said first hood, and pipes surrounding said latter hood the upper ends of which discharge under the upper hood.

WILLIAM H. NORRIS.

Witnesses:
HARRY E. MIDDLETON, Jr.,
SAMUEL B. MILLER.